(12) United States Patent
Moriyama et al.

(10) Patent No.: US 7,542,064 B2
(45) Date of Patent: Jun. 2, 2009

(54) IMAGE FORMING APPARATUS AND METHOD OF CONTROLLING SAME

(75) Inventors: Tsuyoshi Moriyama, Ibaraki-ken (JP); Katsumi Takahashi, Ibaraki-ken (JP); Atsushi Chaki, Chiba-ken (JP); Takahiko Yamaoka, Chiba-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 11/350,775

(22) Filed: Feb. 10, 2006

(65) Prior Publication Data
US 2006/0192842 A1  Aug. 31, 2006

(30) Foreign Application Priority Data
Feb. 28, 2005  (JP)  .............................. 2005-054537

(51) Int. Cl.
 G06F 3/00 (2006.01)
 B41J 2/435 (2006.01)
 B41J 2/44 (2006.01)
(52) U.S. Cl. ...................................................... 347/247
(58) Field of Classification Search ................ 347/240, 347/251, 253, 247
See application file for complete search history.

(56) References Cited

U.S. PATENT DOCUMENTS

| 4,847,641 | A | | 7/1989 | Tung ........................... 347/131 |
| 5,210,545 | A | * | 5/1993 | Tomita ........................ 347/254 |
| 5,818,502 | A | * | 10/1998 | Horie .......................... 347/247 |
| 6,233,000 | B1 | * | 5/2001 | Obata et al. ................. 347/254 |

FOREIGN PATENT DOCUMENTS

| JP | 8-238797 | 9/1996 |
| JP | 2695955 | 9/1997 |

* cited by examiner

*Primary Examiner*—Huan H Tran
(74) *Attorney, Agent, or Firm*—Fitzpatrick, Cella, Harper & Scinto

(57) ABSTRACT

Whether an image to be formed has a prescribed M×N pixel pattern is determined by a comparator. If it is determined that the image has the prescribed M×N pixel pattern, then a light-quantity correction signal that is for reducing the current that flows through a semiconductor laser is output to a laser driving circuit when the laser emits a laser beam of a pixel of interest contained in the M×N pixel pattern.

6 Claims, 17 Drawing Sheets

IMAGE FORMING APPARATUS AND METHOD OF CONTROLLING SAME

FIELD OF THE INVENTION

This invention relates to an image forming apparatus for forming an image by a laser beam and to a method of controlling this apparatus.

BACKGROUND OF THE INVENTION.

A laser printer prints an image based upon image data obtained, for example, by digitizing, i.e., quantizing, an analog image. At such time each scanning line of the image is divided into pixel areas and a laser beam that has been modulated in accordance with each item of pixel data illuminates each pixel area on a photosensitive drum that corresponds to the pixel. The pixel area on the photosensitive drum thus illuminated by the laser beam is converted from an electrically charged state to a discharged state and an electrostatic latent image corresponding to the image data is formed on the photosensitive drum. This electrostatic latent image is visualized by a developing unit and the toner image thereof is transferred to paper to thereby obtain a printed image.

There is strengthening demand for laser printers of improved printing quality and this has been accompanied by the proposal of various techniques. In order to solve the problem of jaggies along diagonal lines, the U.S. Pat. No. 4,847,641 proposes a technique whereby previously stored patterns and a bitmap are compared piece by piece, a compensation dot is generated if there is a match and the dot for which the match was obtained is replaced by the compensation dot. By virtue of this technique, the dots of an edge portion along which jaggies are produced in the original image data are changed to dots (correction dots) of smaller size to thereby partially raise the resolution of the image. As a result, a smooth edge is expressed and an image of higher definition is obtained.

Although a high-definition image is obtained by such a technique, the problem set forth below still arises. By way of example, FIG. 17 illustrates an example in which a two-point very small kanji character ""電"" has been printed at a resolution of 600 dpi×600 dpi. It will be understood that a thickened portion occurs at an intersection of lines in this character. If it is attempted to print a small-point character, e.g., a two-point character (small size character), using a conventional laser printer, there will be instances where at an intersection of lines in the character develops such a thickened portion. Since this a thickened portion has a size on the order of about one pixel, it is almost inconspicuous in the case of a character of ordinary size. However, such a thickened portion becomes more conspicuous as character size decreases.

SUMMARY OF THE INVENTION

Accordingly, an object of the present invention is to solve the aforesaid drawbacks of the prior art.

Further, the present invention provides an image forming apparatus that makes it possible to reproduce an excellent image by diminishing image deformation that occurs at the portion of a specific pattern in the image, as well as a method of controlling this apparatus.

According to the present invention, there is provided with an image forming apparatus comprises:

an image forming unit configured to form an image based upon a laser beam emitted from a semiconductor laser in accordance with an image signal;

a driving unit configured to drive a current through the semiconductor laser;

a determination unit configured to determine whether a M×N pixel pattern included in the image formed by the image forming unit has a pattern representing an intersection of plural lines or a pattern representing a part of the intersection; and a control unit configured to control the driving unit to reduce the current that flows through the semiconductor laser when the laser beam of a pixel to be controlled contained in the pattern is emitted, in a case where it is determined by the determination unit that the image has the pattern, wherein the control unit controls to reduce the current in a unit of (1/n) pixel in which one pixel period is divided.

Further, according to the present invention, there is provided with a method of controlling an image forming apparatus for forming an image based upon a laser beam emitted from a semiconductor laser in accordance with an image signal, comprising:

a determination step of determining whether a M×N pixel pattern included in an image to be formed has a pattern representing an intersection of plural lines or a pattern representing a part of the intersection; and a control step of controlling to reduce the current that flows through the semiconductor laser when the laser beam of a pixel to be controlled contained in the pattern is emitted, in a case where it is determined in the determination step that the image has the pattern, wherein the control step controls to reduce the current in a unit of (1/n) pixel in which one pixel period is divided.

The features of the invention are achieved by a combination of the features set forth in the independent claims, while the dependent claims define specific advantageous examples of the invention.

Other features and advantages of the invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A preferred embodiment of the present invention will now be described in detail with reference to the accompanying drawings. It should be noted that the embodiments below do not limit the present invention set forth in the claims and that not all of the combinations of features described in the embodiments are necessarily essential as means for attaining the objects of the invention.

First Embodiment

Figure 2:
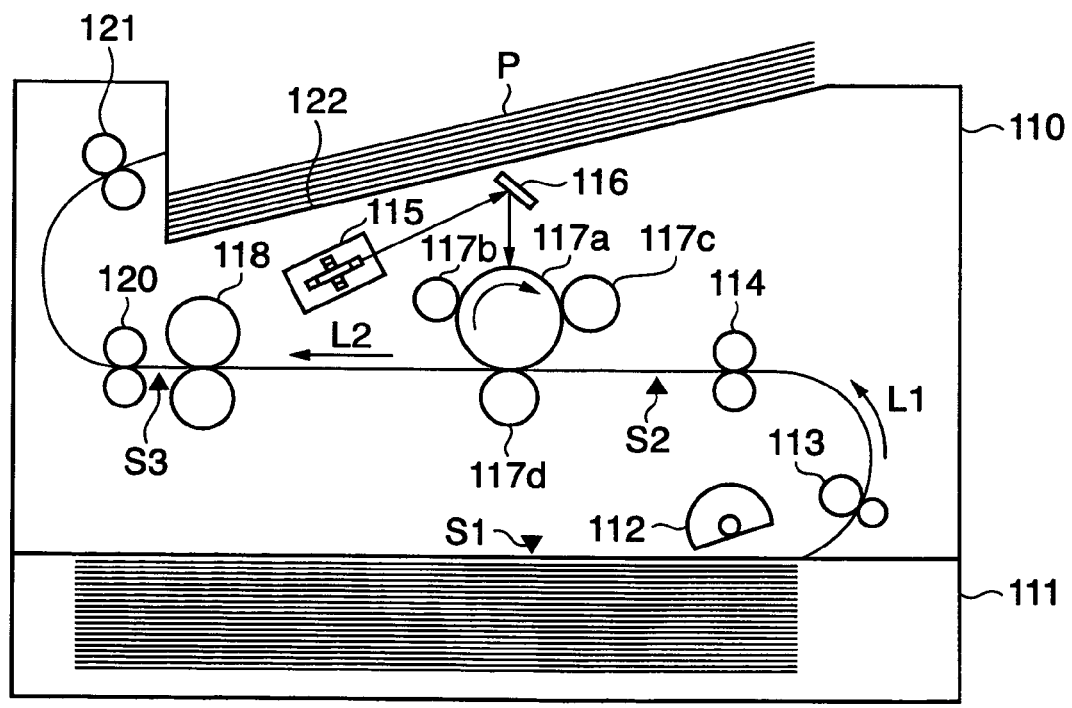
FIG. 2 depicts a schematic sectional view of the laser printer according to this embodiment.

FIG. 2 depicts a schematic sectional view of a laser printer according to an embodiment of the present invention.

As shown in FIG. 2, reference numeral 110 denotes the main body of a laser printer, and reference numeral 111 denotes a paper cassette in which a plurality printing sheets (printing medium) are stacked and accommodated. A sheet detecting sensor S1 detects whether the paper cassette 111 contains paper (printing sheets). A paper is picked up from the paper cassette 111 by rotation of a pick-up roller and is conveyed in the direction of arrow L1 by rotation of a pair of conveyance rollers 113. The paper is further conveyed in the direction of arrow L2 on a conveyance path within the printer by rotation of a pair of conveyance rollers 114. Travel of the paper is sensed by a feed sensor S2. In response to a detection signal from the feed sensor S2, the leading and trailing edges of the conveyed paper are detected and the timing at which the image is formed is decided accordingly.

A laser scanner unit 115 emits a laser beam that has been pulse-width modulated based upon image data entered externally. The laser beam is reflected and scanned in a raster direction by a polygon mirror and is scanned across a photosensitive drum 117a by a mirror 116 to form an electrostatic latent image on the drum. The surface of the photosensitive drum 117a is charged uniformly by a charger 117b before it is illuminated by the laser beam. When the laser beam is emitted, the emitted portion of the drum is discharged and becomes an electrostatic latent image. Toner from a developer 117c attaches itself to the electrostatic latent image, whereby the image is developed. The developed toner image is transferred by a transfer roller 117d to the paper that has been conveyed along the conveyance path. The toner image transferred to the paper is subsequently fixed to the paper by a thermal fixing unit 118. The latter comprises a heating roller incorporating a heating element, a pressing roller that brings the paper into pressured contact with the heating roller, and a thermistor for sensing the temperature of the roller. The paper that has undergone the transfer process is subjected to heat and pressure to thereby fix the toner image to the paper. When a discharge sensor S3 senses that the paper has passed by the fixing unit 118, a pair of discharge rollers 120, 121 is driven into rotation to discharge the paper that has passed the fixing unit 118 into a discharge tray 122. FIG. 2 illustrates a state in which discharged paper P on which printing has been completed has stacked up on the discharge tray 122.

Figure 1:
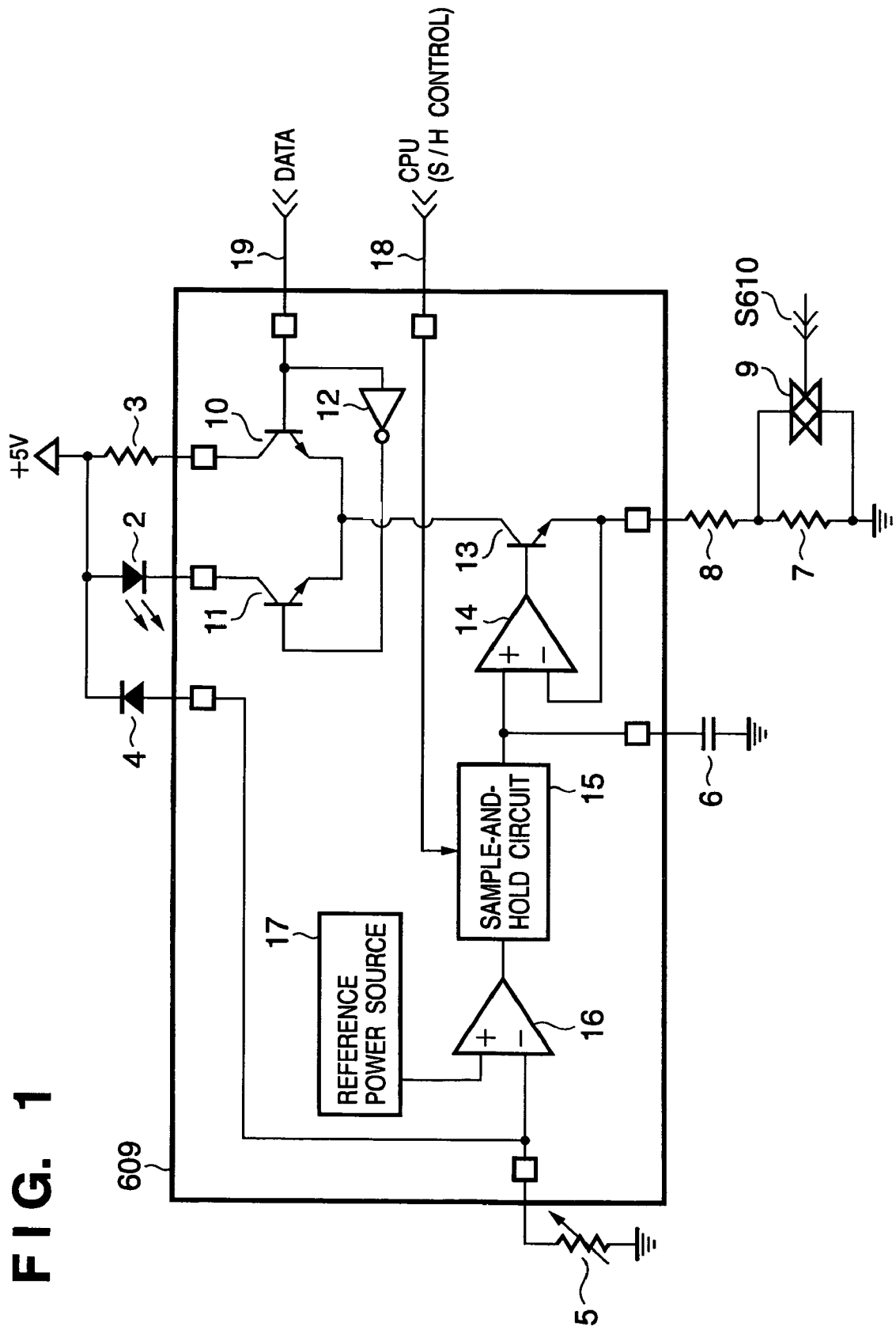
FIG. 1 depicts a circuit diagram illustrating the configuration of a laser driving circuit in a laser printer according to an embodiment of the present invention.

FIG. 1 is a circuit diagram illustrating the configuration of a laser driving circuit 609 in the laser printer 110 according to this embodiment.

In FIG. 1, a photodiode 4 detects the amount of laser light emitted from a semiconductor laser 2. A dummy resistor 3 is a resistor for passing a current when the semiconductor laser 2 is turned off. A semi-fixed resistor 5 is a variable resistor for adjusting the amount of laser light emitted from the semiconductor laser 2. Usually the adjustment is made when the product is shipped or by a maintenance and inspection individual. Reference numeral 6 denotes a sample-and-hold capacitor. Resistors 7 and 8 are resistors for setting the laser driving current that passes through the semiconductor laser 2. When an analog switch 9 is OFF (open), the resistors 7 and 8 are connected in series. When the analog switch 9 is turned on, however, the connection between the resistors 7 and 8 is grounded and the value of the current that flows through the resistor 8 increases. It should be noted that the on/off action of the analog switch 9 is controlled by a signal S610 (described later).for correcting the amount of laser light. It should be noted that the present invention is not limited to such an analog switch 9 and that a high-speed switching transistor or relay switch may be used instead.

Described next will be the operation of each component of the laser driving circuit 609 and the operation of APC (Automatic Power Control).

When a data (PWM) signal 19 falls to the low level, the output of an inverter 12 attains the high level and a switching transistor 11 on the side of the semiconductor laser 2 turns on. At the same time, a switching transistor 10 on the side of the dummy resistor 3 turns off. Thus, the switching transistors 10 and 11 always operate counter to each other owing to the intermediary of the inverter 12.

An operational amplifier 14 for constant-current control and a transistor 13 control the laser current that flows through the semiconductor laser 2. The voltage of the sample-and-hold capacitor 6 is applied to the positive-input side of the operational amplifier 14 and the voltage at the point where the resistor 8 is connected is applied to the negative-input side of the operational amplifier 14. Accordingly, the laser driving current is controlled in such a manner that the voltage at the point of connection of resistor 8, which is for setting the laser driving current, becomes equal to the voltage of the sample-and-hold capacitor 6. Here it is possible to suppress loss in the setting resistor of the laser driving current by employing a current mirror circuit in such a manner that a current that is ½ or ⅓ to 1/20 or 1/30 of the laser current will flow into the resistor 7 or 8. However, in order to simplify the description of function, this is not illustrated in FIG. 1.

A current flows into the adjustment semi-fixed resistor 5 owing to the current that flows through the photodiode 4 that has received the back beam of the semiconductor laser 2. As a result, a voltage proportional to the amount of laser light of semiconductor laser 2 is produced across the semi-fixed resistor 5. The voltage produced in the semi-fixed resistor 5 and the voltage of a reference power source 17 are compared by an error amplifier 16 and the result of the comparison is output to a sample-and-hold circuit 15. At the time of APC operation, a sample/hold signal 18 attains the high level and the sample-and-hold circuit 15 is in the sampling state. Consequently, the output of the error amplifier 16 is applied to the capacitor 6 and to the positive-input side of the operational amplifier 14 for laser current control. The output of the operational amplifier 14 is input to the base of the transistor 13. A voltage of the emitter of the transistor 13 is controlled to become the same as a voltage applied to the sample-and-hold capacitor 6, and therefore the current that flows through the semiconductor laser 2 is decided by the resistors 7 and 8.

When printing is performed, on the other hand, since the sample/hold signal 18 from the controller (CPU) is sent to the low level, the sample-and-hold circuit 15 is placed in the holding state and the semiconductor laser 2 is turned on and off owing to the low and high levels (PWM) of the data signal 19, as a result of which an image is formed using the laser beam.

Figure 3:
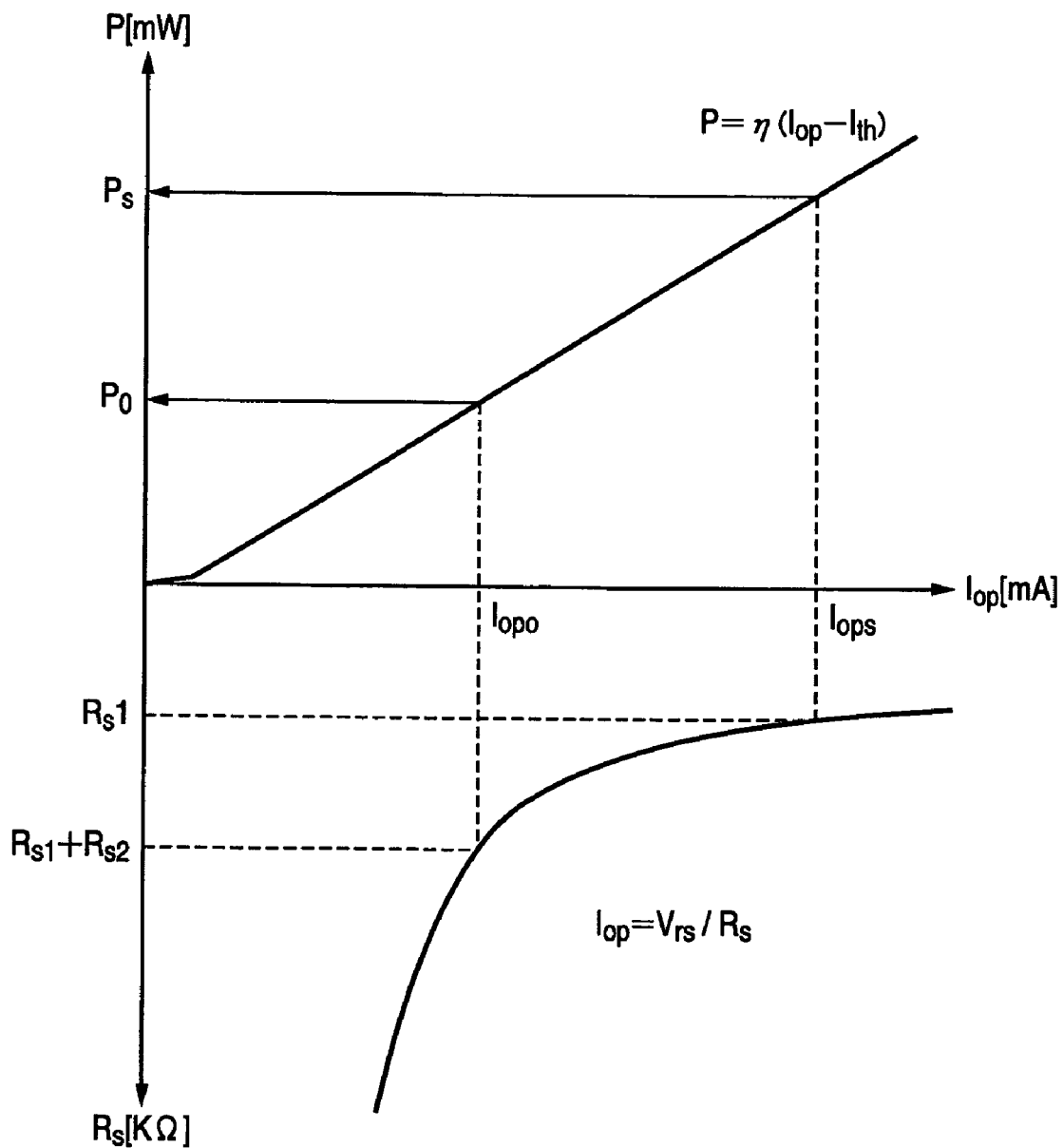
FIG. 3 is a diagram useful in describing the relationship among resistors in FIG. 1, laser driving current and amount of laser light.

FIG. 3 is a diagram for describing the relationship among the resistors 7, 8, laser driving current and amount of laser light. This illustrates the state which prevails when the analog switch 9 is closed.

Under these conditions, sampling is carried out and holding is performed in the print area. Since the resistor 7 is short-circuited at this time by the analog switch 9, a voltage Vrs identical with the voltage value being applied to the sample-and-hold capacitor 6 is maintained across the resistor 8. The following relation holds at this time:

$$Iops = Vrs/Rs1 \quad (1)$$

where Iops represents the laser driving current and Rs1 the resistance value of resistor 8.

If we let η [mW/Ma] represent the differential efficiency of the semiconductor laser 2 and let Ith [mA] represent a threshold-value current, then an amount Ps of laser light prevailing when the analog switch 9 is short-circuited is as indicated below equation (2). Here it is assumed that the laser driving current Iops that prevails when the semiconductor laser 2 is emitting a prescribed amount of laser light is sufficiently larger than the threshold-value current Ith.

$$Ps = \eta(Iops - Ith) \approx \eta Iops = \eta(Vrs/Rs1) \quad (2)$$

Thus, sampling by the sample-and-hold circuit 15 is performed with the analog switch 9 in the closed state, and the analog switch 9 is opened at a prescribed timing, described later. With the analog switch 9 in the open state, the resistors 7 and 8 become serially connected. As a result, a current flows through the resistor 7 and a voltage Vrs identical with that impressed upon the sample-and-hold capacitor 6 is maintained cross the resistors 7, 8. If we let Iopo represent the laser driving current at this time and let Rs2 represent the resistance value of the resistor 7, then the laser driving current Iopo prevailing when the analog switch 9 is shorted-circuited and the amount Po of laser light are expressed by the following equations:

$$Iopo = Vrs/(Rs1 + Rs2)$$

$$Po = (Iopo - Ith) \approx \eta Iopo = \eta[Vrs/(Rs1 + Rs2)]$$

$$\text{Therefore, } Ps/Po = (Rs2/Rs1) + 1 \quad (3)$$

In view of the foregoing, it will be understood that the amount of laser light at holding time can be varied based upon the set values (resistances) of resistors 7, 8 and on/off control of the analog switch 9.

Next, reference will be had to FIGS. 4 to 8 to describe the structure of the laser printer 110 according to the first embodiment.

Figure 4:
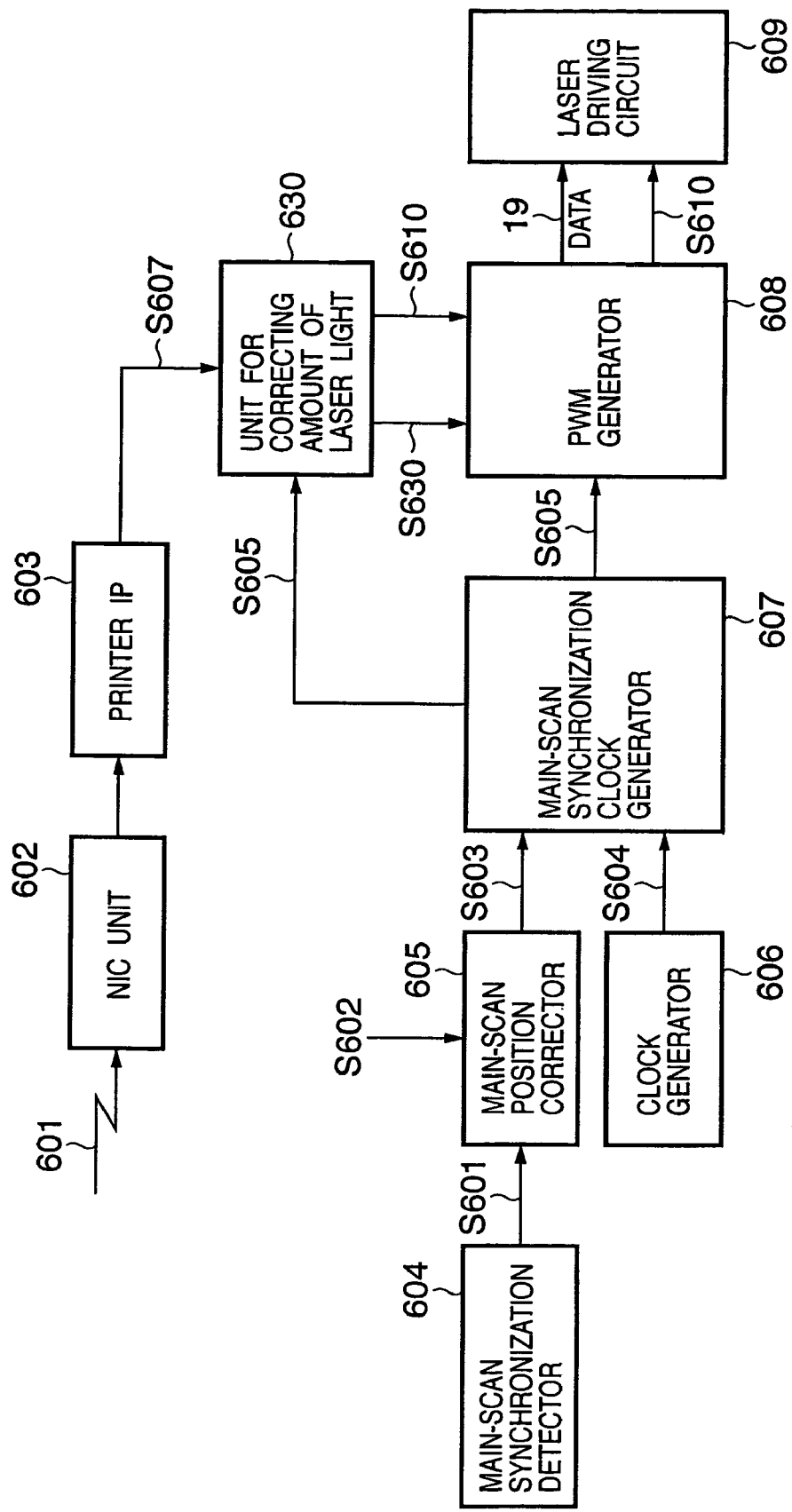
FIG. 4 is a block diagram for describing the principal components of a controller that controls image formation in a laser printer according to a first embodiment of the present invention.

FIG. 4 is a block diagram for describing the principal components of a controller that controls image formation in the laser printer 110 according to the first embodiment of the present invention.

In FIG. 4, a computer device (not shown) is connected to a network 601. The computer device runs application software for executing so-called DTP (DeskTop Publishing) to create and edit various documents and graphics. The computer device converts the created document/graphic to Page Description Language and transmits the results to the laser printer 110 via the network 601 to print the same. The laser printer 110 has an NIC (Network Interface Card) unit 602 for exchanging image data and apparatus information utilizing the network 601.

Figure 5:
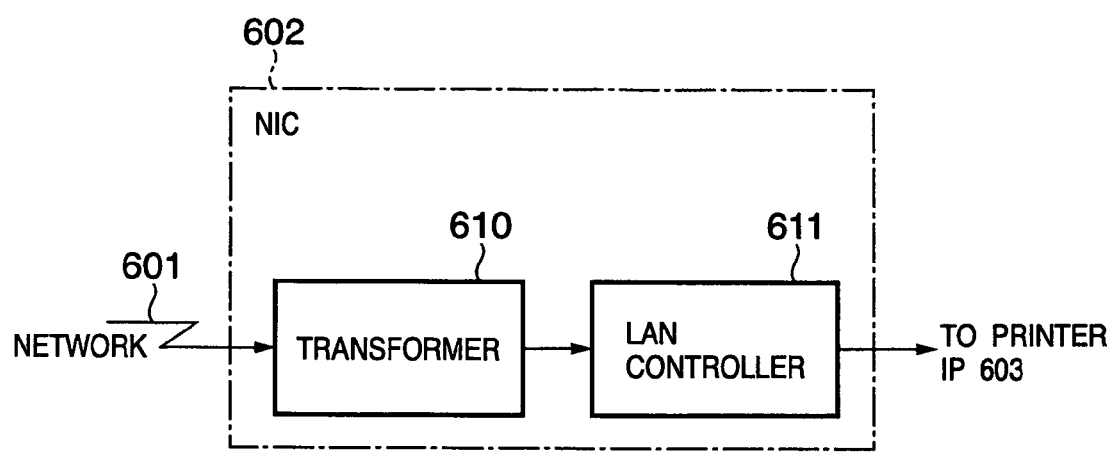
FIG. 5 is a block diagram illustrating the structure of a NIC unit according to this embodiment.

FIG. 5 is a block diagram illustrating the structure of the NIC unit 602 according to this embodiment.

The NIC unit 602 has a function for interfacing the network 601 and serves to acquire information from the outside utilizing an Ethernet (a LAN having a bus structure developed by three US corporations Centronics, DEC and Intel) cable such as 10Base-T/100Base-TX. If information is acquired from the outside, first a voltage conversion is applied by a transformer 610 and the voltage obtained is sent to a LAN controller 611. The latter has an internal first buffer memory (not shown). Upon determining that the information therein is necessary information, the LAN controller 611 sends the information to a second buffer memory (not shown) and subsequently passes a signal into a printer IP (image processor) 603.

Figure 6:
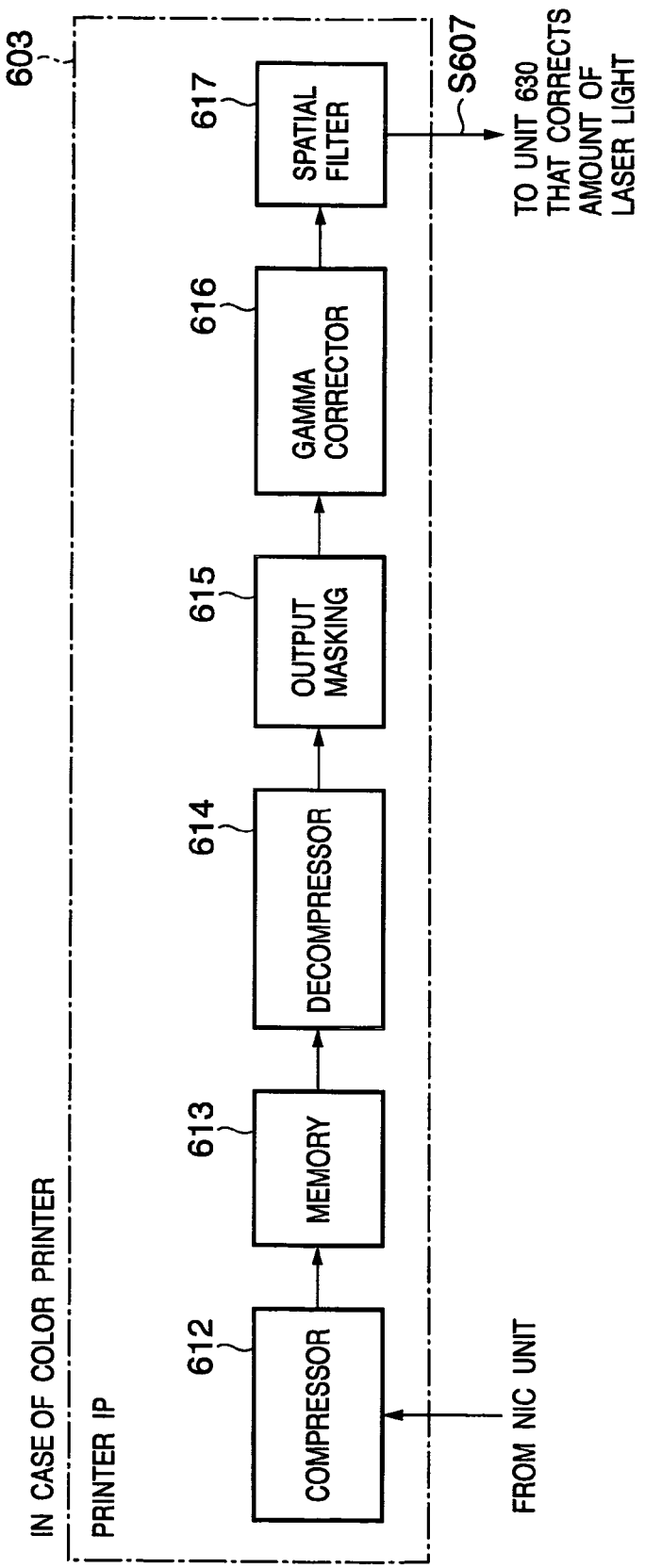
FIG. 6 is a block diagram illustrating the structure of a printer IP (image processor) in the laser printer according to this embodiment.

FIG. 6 is a block diagram illustrating the structure of the printer IP 603 (in the case of a color printer) in the laser printer 110 according to this embodiment.

Image data that has been sent from the NIC unit 602 is compressed by a compressor 612 and stored in a memory 613 comprising a large-capacity memory such as a hard disk. The compressed data is subsequently decompressed by a decompressor 614 and then sent to an output masking unit 615. The compression scheme used by the compressor 612 is of an ordinary type, such as JPEG (Joint Photographic Experts Group), JBIG (Joint Bi-Level Image Experts Group) or ZIP. The image data thus compressed is managed job by job and stored in the memory 613 together with additional data such as file name, creator, creation date and time and file size. Furthermore, if a job number and password are provided and also stored together with the above, a personal-box function can be supported. This is a function that allows temporary storage of data and makes it possible only for a specific individual to perform printout (i.e., to read data out of the memory 613). In a case where printout of a job that has been stored in the memory 613 has been designated, the encoded image data is read out of the memory 613 after authentication by password is performed, then the image data is decompressed by the decompressor 614, the decompressed image data is restored to a raster image and the image is sent to the output masking unit 615.

An output masking/UCR circuit 615 converts signals representing a magenta component (M1), cyan component (C1) and yellow component (Y1) of the image signal to signals representing yellow (Y), magenta (M), cyan (C) and black (K), which are the toner colors of the laser printer 110 using a matrix computation. Next, a gamma corrector 616 effects a conversion to C, M, Y, K data for image output by a look-up table (LUT) RAM that takes various characteristics such as the tint of the toner into consideration. A spatial filter 617 applies sharpness or smoothing processing and then outputs an image signal S607, which is the result of the conversion, to a unit 630 (FIG. 4) that corrects the amount of laser light.

Figure 7:
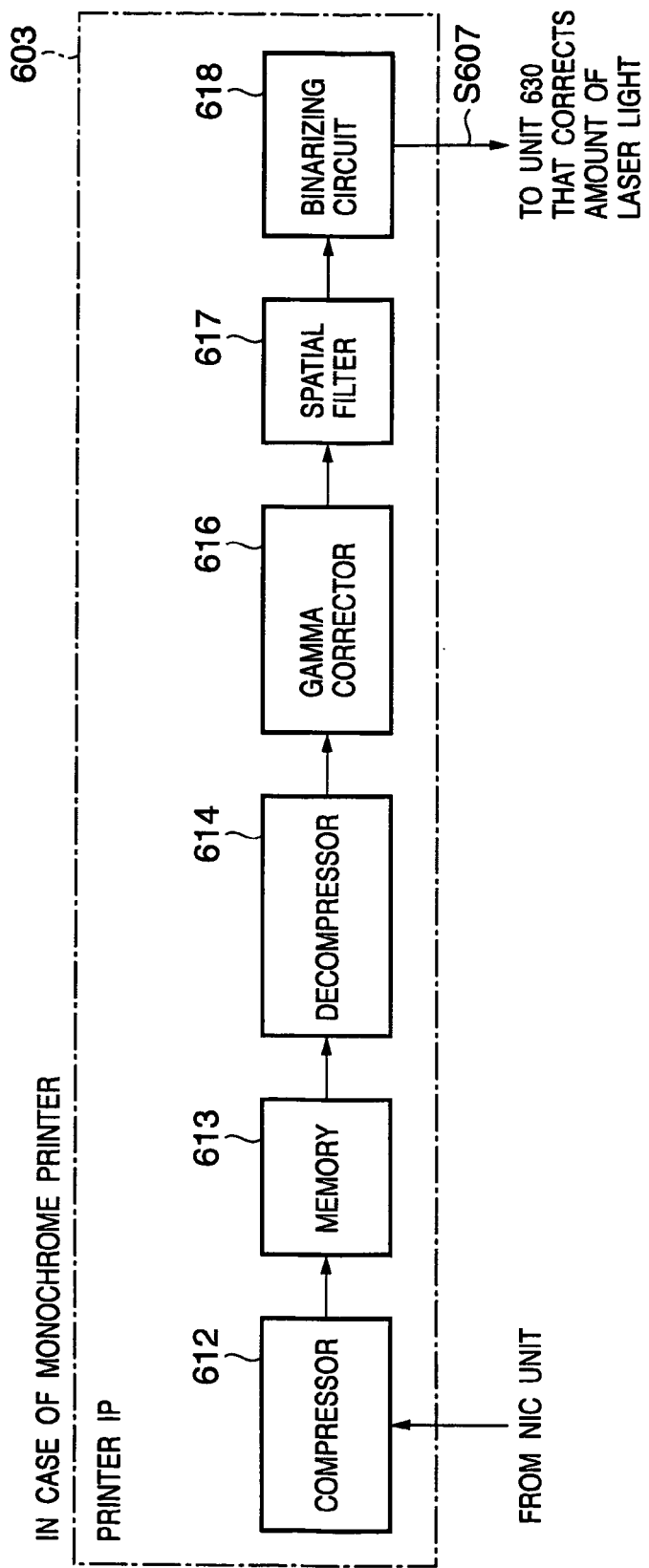
FIG. 7 is a block diagram illustrating the structure of the printer IP in a case where the laser printer according to this embodiment is a monochrome printer.

FIG. 7 is a block diagram showing the structure of the printer IP 603 in a case where the laser printer is a monochrome printer. Components similar to those shown in FIG. 6 are designated by like reference characters and need not be described again.

In FIG. 7, the output masking circuit 615 for the color conversion in FIG. 6 is eliminated and a binarizing circuit 618 is provided on the output side of the spatial filter 617. Pulse-width modulation is executed based upon the binary image signal S607 from the binarizing circuit 618.

With reference again to FIG. 4, the controller further includes a main-scan synchronization detector 604, and a clock generator 606 for generating a clock signal. A main-scan position corrector 605 is a correction circuit for delaying a main-scan synchronization signal S601, which has been output by the main-scan synchronization detector 604, by an amount of delay that is in accordance with a positional correction designation signal S602 specified by the CPU. A corrected main-scan synchronization signal S603, which has been output by the main-scan position corrector 605, and a clock signal S604 output by the clock generator 606 are input to a main-scan synchronization clock generator 607, which proceeds to output a pixel clock S605 synchronized to the corrected main-scan synchronization signal S603. A PWM generator 608 generates a PWM signal from the pixel clock S605, which is output from the main-scan synchronization clock generator 607, and pixel data S630 that is supplied from the unit 630 that corrects the amount of laser light. A laser driving circuit 609 drives the semiconductor laser 2 in accordance with the PWM signal (DATA) that has been output from the PWM generator 608. The laser driving circuit 609 is constituted by the circuitry described in conjunction with FIG. 1.

Figure 8:
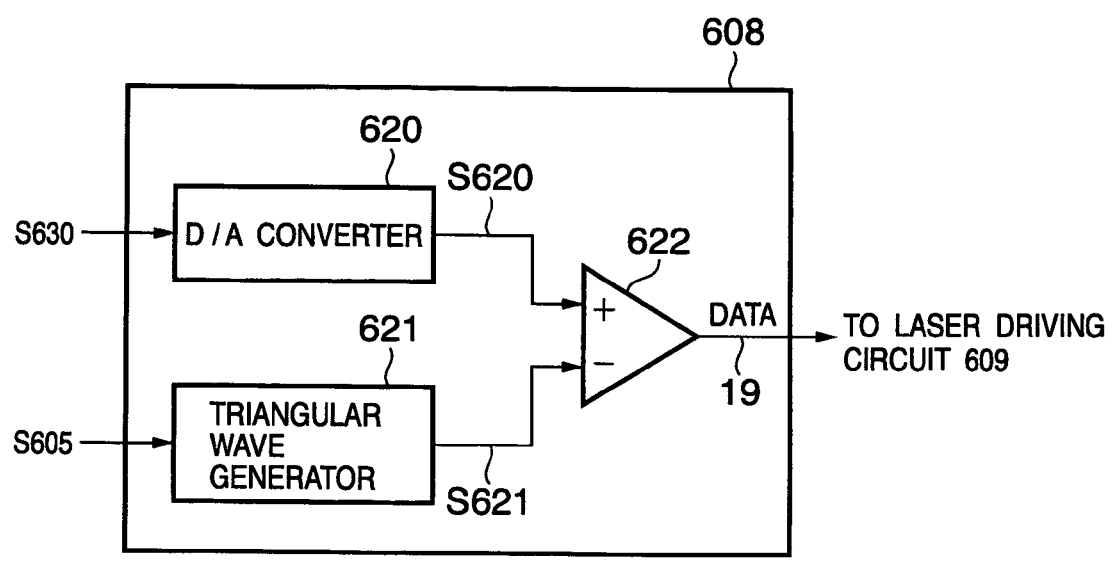
FIG. 8 is a block diagram for describing the structure of a PWM unit according to this embodiment.

FIG. 8 is a block diagram for describing the structure of the PWM generator 608 according to this embodiment.

In FIG. 8, a D/A converter 620 subjects the image signal S630, which enters from the unit 630 that corrects the amount of laser light, to a digital-to-analog conversion to thereby generate an analog signal S620. A triangular wave generator 621, which includes an integrator, is driven by the pixel clock S605 supplied from the main-scan synchronization clock generator 607, thereby generating a triangular wave S621 having a period identical with that of the pixel clock S605. A comparator 622 compares the analog signal S620, which conforms to the image data that has been output from the D/A converter 620, and the triangular wave S621 that has been output from the triangular wave generator 621. The signal output from the comparator 625 becomes the PWM signal (DATA) 19 that conforms to the triangular wave S621 output from the triangular wave generator 621.

In the case of a color printer, the PWM generator 608 comprises a total of four circuits, namely one for each of yellow (Y), magenta (M), cyan (C) and black (Bk). The relative amount of offset of each color along the main-scan direction is calculated by the controller and the amount of positional correction conforming to each color is input to the main-scan position corrector 605 of each color. The offset in (1/n) pixel units of each color along the main-scan direction is thus corrected. Further, in the case of a color printer, it goes without saying that the image forming unit shown in FIG. 2 is provided for each of the four colors.

Figure 9:
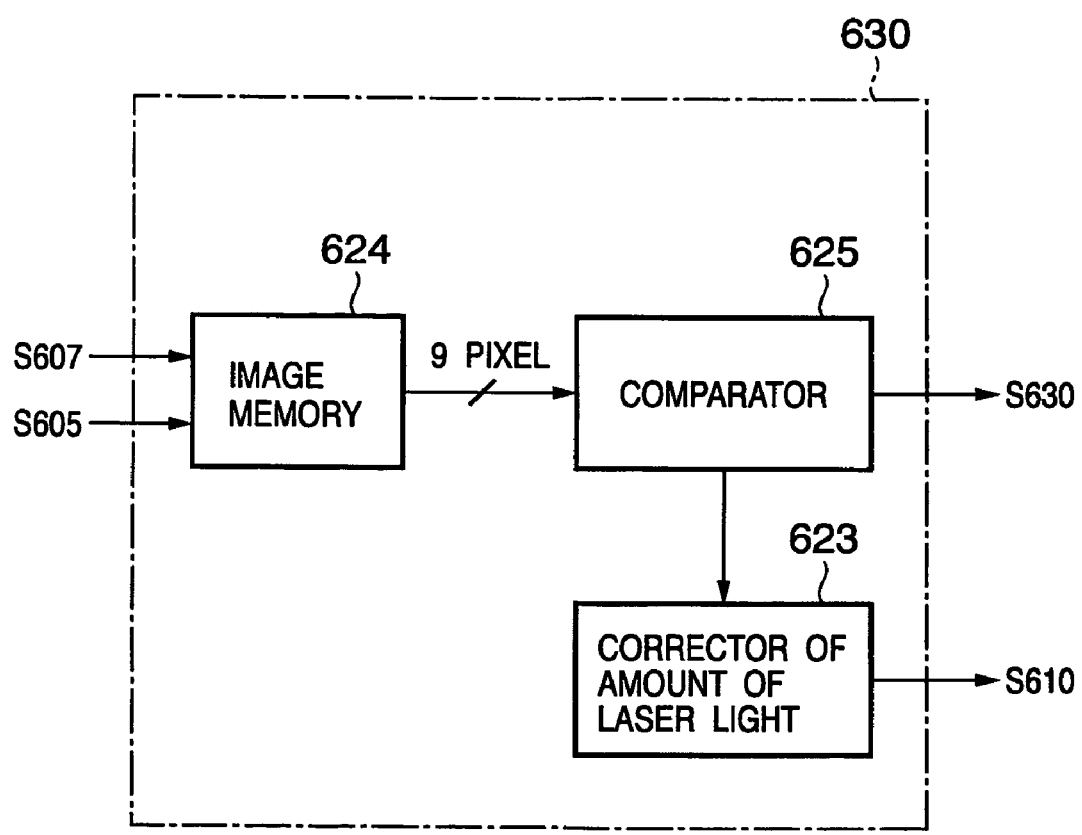
FIG. 9 is a block diagram illustrating the structure of a unit for correcting the amount of laser light in the laser printer according to this embodiment.

FIG. 9 is a block diagram showing the structure of unit 630 for correcting the amount of laser light in the laser printer 110 according to this embodiment.

The unit 630 that corrects the amount of laser light receives input, in parallel in the order of the raster scan, of image signals S607 of a plurality of scanning lines output from the printer IP 603 and stores the signals in an image memory 624. The latter is constituted by a first-in, first-out (FIFO) memory. The image memory (FIFO) 624 is so adapted that the image data that has been stored here can be read out in nine-pixel units as a sampling window comprising M×N pixels. In this embodiment, at least three scanning lines of pixel data can be stored in the image memory 624 and the pixel data can be read out as matrix data of 3×3 pixels.

Figure 10:
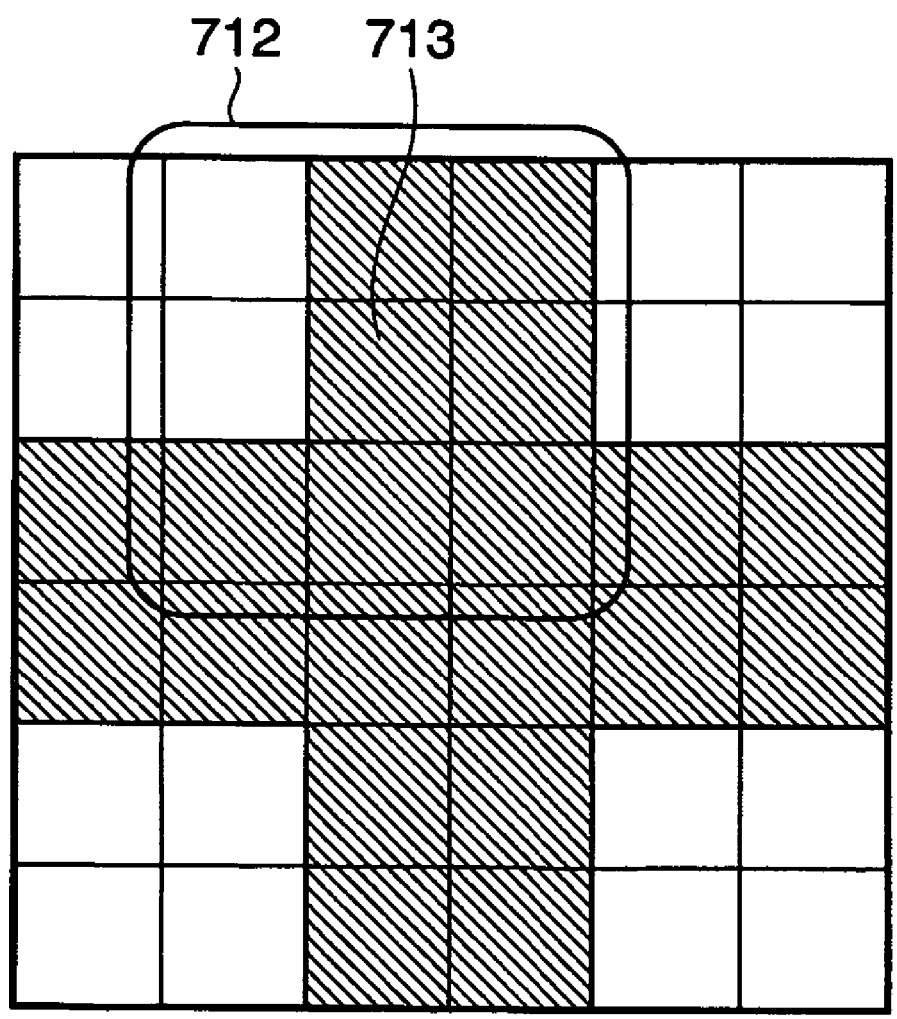
FIG. 10 is a diagram useful in describing a sampling window according to this embodiment.

FIG. 10 is a diagram useful in describing a sampling window according to this embodiment.

Here a sampling window 712 is composed of 3×3 pixels. Inside the sampling window 712 is a pixel 713 of interest.

The image data that has been stored in the image memory 624 shifts through the FIFO memory in sync with the pixel clock 605, thereby moving the sampling window 712 successively so that reference can be made to the central pixel 713 and the pixels surrounding it. The nine-pixel data thus referred to is input to a comparator 625, which compares this data with previously stored prescribed pixel patterns in units of the 3×3 pixel matrix. The result of the comparison is sent to a corrector 623 that corrects the amount of laser light. If the comparator 625 determines that the pixel data in the sampling window 712 and a prescribed pixel pattern match, then the corrector 623 transmits a light-quantity correction signal S610 to the PWM generator 608 so as to diminish the amount of laser light with respect to the central pixel 713. As a result, the signal S610 is output as a high level signal and the analog switch 9 is turned off (the amount of laser light is reduced).

If the comparator 625 determines that the pixel data in the sampling window 712 and a prescribed pixel pattern do not match, then the light-quantity correction signal S610 for diminishing the amount of laser light with respect to the central pixel 713 is not output (the amount of laser light is not reduced), i.e., the signal S610 remains low level.

The light-quantity correction signal S610 that has been transmitted to the PWM generator 608 is output from the PWM generator 608 to the laser driving circuit 609 (FIG. 1) in sync with the PWM signal (DATA) 19 of the pixel data that is to be corrected.

It should be noted that the comparator 625 is constituted by a programmable logic array (PLA) capable of high-speed computation. The PLA basically comprises AND elements and OR elements combined in the form of an array, and any logical function can be defined by turning the points of the array on and off. Accordingly, logical functions the number of which is equivalent to the number of comparison patterns are defined beforehand in the PLA.

It should be noted that the unit 630 that corrects the amount of laser light and the PWM generator 608, etc., may be implemented by an ASIC (Application-Specific IC).

A specific example will now be described with regard to control of laser drive in the semiconductor laser 2.

Figure 11:
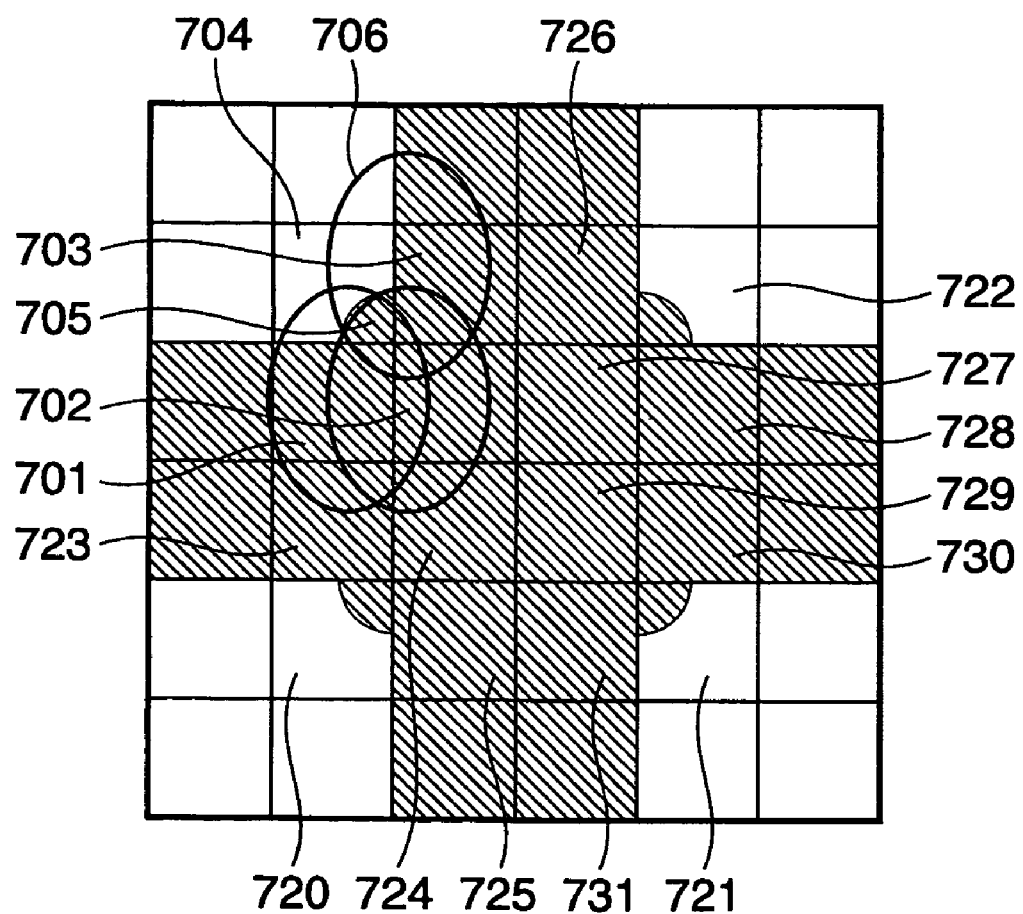
FIG. 11 is an enlarged view of part of a thick portion produced at an intersection of two lines in the kanji character shown in FIG. 17.
Figure 17:
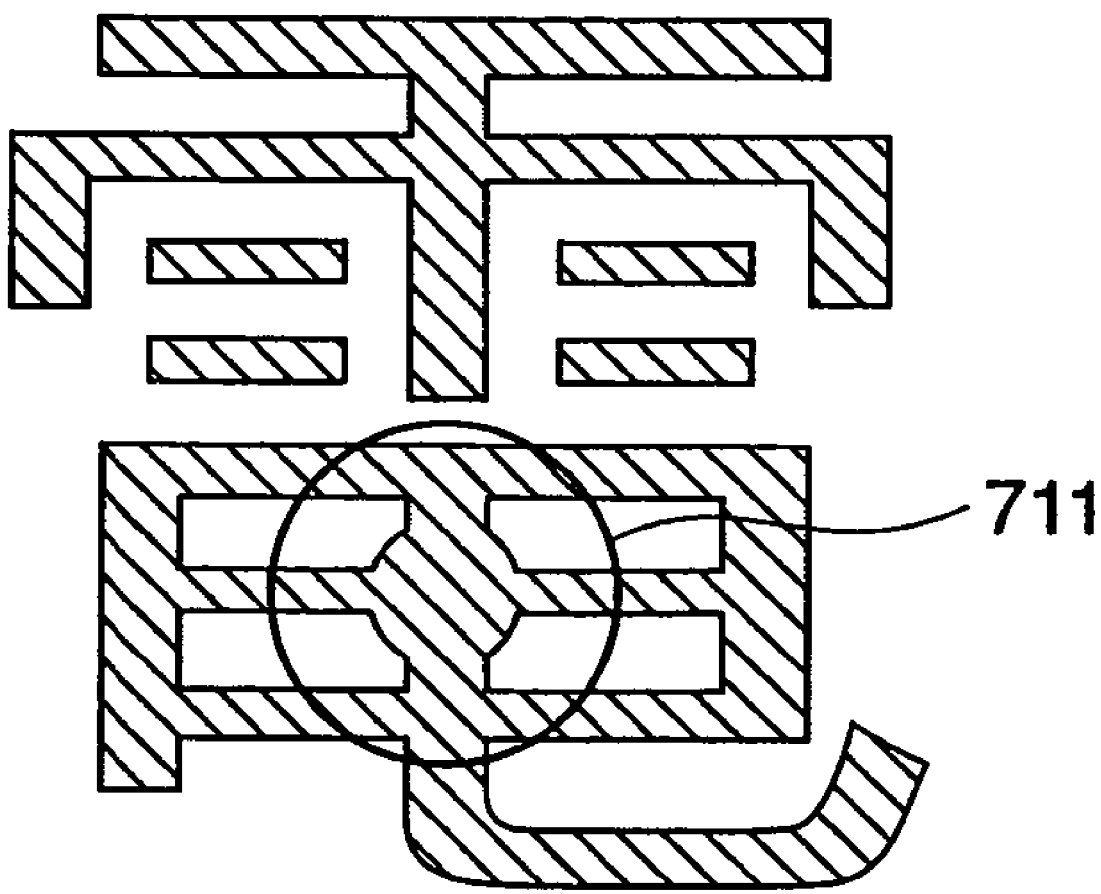
FIG. 17 is a diagram useful in describing the problems of the prior art.

FIG. 11 is an enlarged view of part of a thick portion 711 (FIG. 17) produced at an intersection of two lines in the kanji character ""電"" shown in FIG. 17. Each box in FIG. 11 indicates one pixel. If the resolution is, e.g., 600 dpi, then the size of one pixel will be about 42.3 µm×42.3 µm.

Pixels indicated in white in FIG. 11 are pixels that do not form a toner image, i.e., pixels for which the semiconductor laser 2 is turned off. Pixels indicated by hatching are pixels that form a toner image, i.e., pixels for which the semiconductor laser 2 is turned on. An ellipse 706 schematically illustrates a laser spot on the photosensitive drum 117a. In this embodiment, the semiconductor laser 2 employs a red laser having a wavelength of 650 to 680 nm. The size of the spot in this case is about 50×60 µm. This spot size is slightly larger than the size of one pixel. In order to facilitate the description, only some of the laser spots in close proximity to a white pixel 704 are illustrated. In actuality, the semiconductor laser 2 is turned on continuously at portions of pixels for which the laser is on.

In FIG. 11, the pixel 704 adjacent the intersection of the straight lines is composed of pixel data that is white. Nevertheless, a toner image (705) is formed in a part of the pixel 704 owing to the influence of the spot of the semiconductor laser 2 that has illuminated the black pixels (black pixels in the case of a monochrome image, but pixels of each of the colors in the case of a color image) 701, 702, 703 that constitute the lines adjacent the pixel 704. The reason for this is that parts of the tail portions of the spots for black pixels 701, 702, 703 overlap in the area of the pixel 704, causing the potential of the drum 117a in this portion to exceed the image developing bias. Toner becomes affixed to the portion 705 and results in the formation of a toner image.

Accordingly, in this embodiment, the amount laser light of semiconductor laser 2 that illuminates the black pixels 701, 702, 703 adjacent the white pixel 704 is made less than the usual amount of laser light in such a manner that a toner image will not be formed in the white pixel 704 adjacent such an intersection.

Similarly, the amount of laser light that illuminates black-pixel groups 723 to 725, 729 to 731 and 726 to 728 adjacent white pixels 720, 721 and 722, respectively, is controlled in like fashion so as to be less than the usual amount.

In order to detect the pattern that influences to the white pixels adjacent an intersection in the unit 630 that corrects the amount of laser light, patterns that form intersections where two or more fine, straight lines intersect are stored beforehand in the programmable logic array (PLA) as comparison patterns.

Further, according to this embodiment, the amount of laser light at the time of correction is made two-thirds of the usual in such a manner that the multiple exposure level in the area of a white pixel adjacent an intersection will fall below a threshold value on developing bias.

Figure 12:
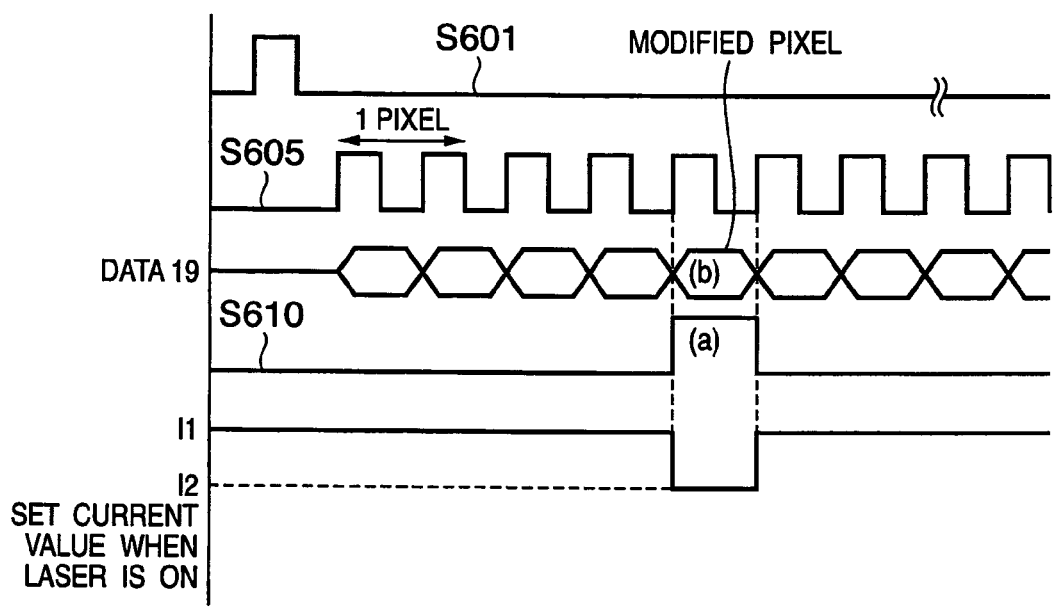
FIG. 12 is a timing chart for describing correction of amount of laser light according to the first embodiment.

FIG. 12 is a timing chart for describing correction of amount of laser light according to the first embodiment. Signals similar to those shown in FIG. 4 are designated by like reference characters.

The pixel clock S605 is output from the main-scan synchronization clock generator 607 in sync with the main-scan synchronization signal S601 that is output from the main-scan synchronization detector (BD sensor) 604. If it is determined by the comparator 625 at the timing of the pixel (modified pixel) indicated at (b) in FIG. 12 that the DATA signal 19 that is output from the PWM generator 608 matches a prescribed comparison pattern, then the signal S610 for correcting the amount of laser light is output at the high level at this timing from the corrector 623 that corrects the amount of laser light. As a result, the analog switch 9 opens, the emitter potential of the transistor 13 rises and the value of the current that flows through the semiconductor laser 2 is kept low. In FIG. 12, the current value when the laser is on is reduced from I1 to I2 (where I1>I2 holds).

Figure 13:
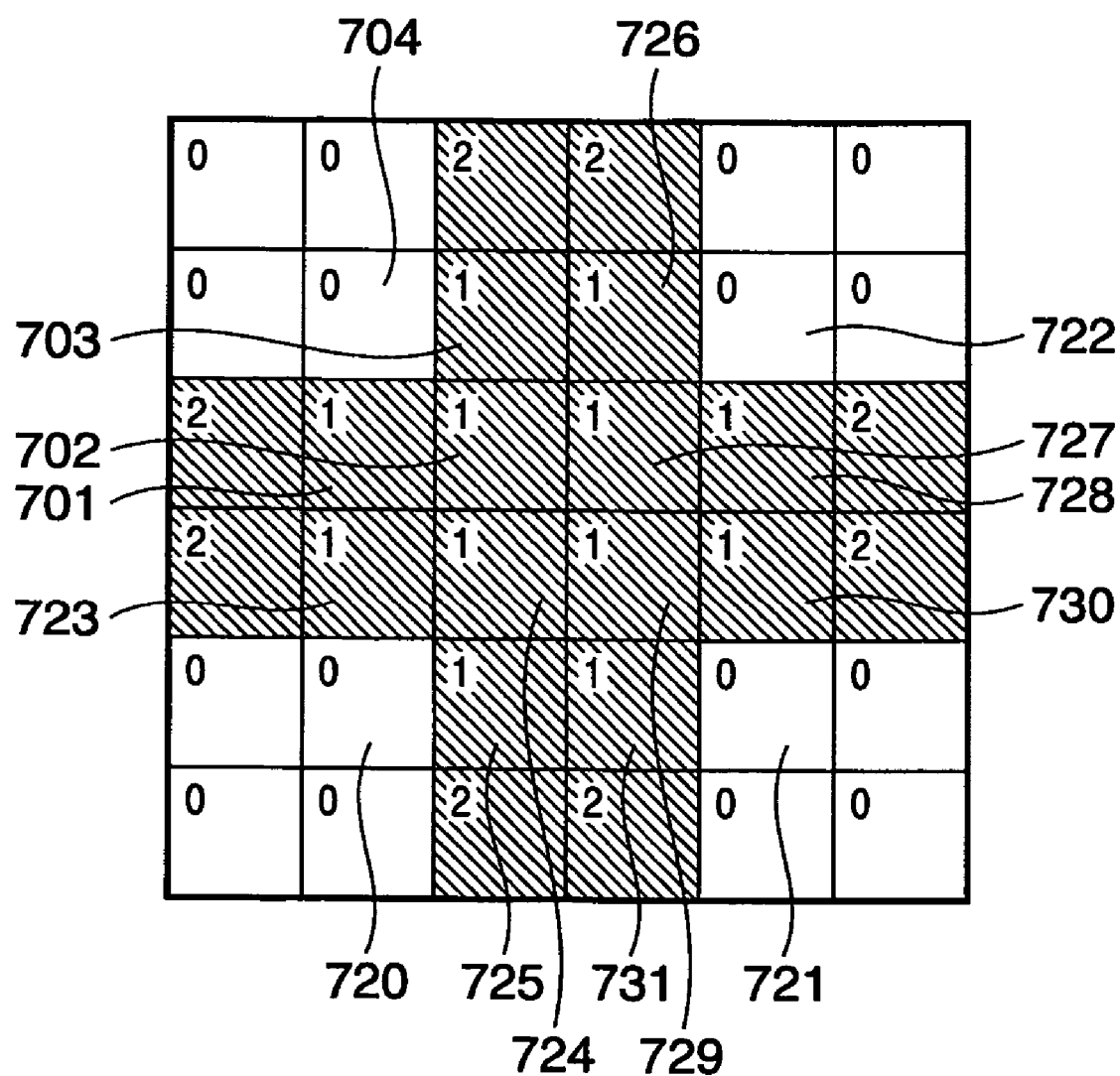
FIG. 13 is a diagram useful in describing a change in amount of laser light at each pixel as a result of controlling laser driving current in this embodiment at pixel positions identical with those in FIG. 11.

FIG. 13 is a diagram useful in describing a change in amount of laser light at each pixel as a result of controlling laser driving current in this embodiment at pixel positions identical with those in FIG. 11.

The numerals indicated in the pixels in FIG. 13 represents the levels of amounts of laser light with which the pixels have been illuminated. For example, data "0" indicates laser OFF, data "2" indicates laser ON and ordinary amount of laser light, and data "1" indicates laser ON and an amount of laser light that is two-thirds of the amount of laser light in the case of data "2".

As will be apparent if a comparison is made with FIG. 11 described above, the amount of laser light for the laser-ON (black) pixels 701, 702, 703 adjacent a white pixel 704 of interest is about two-thirds of the ordinary amount of laser light. As a result, the potential in the area of the white pixel 704 of interest on the photosensitive drum 117a can be made less than the threshold value of the developing bias. Thus, toner will no longer become affixed at an unintended position and increased thickness at intersections in small-point characters is reduced.

Similarly, with regard to other white pixels 720, 721 and 722, the amount of laser light at the neighboring laser-ON pixels is held at "1", namely at about two-thirds of the ordinary amount of laser light.

In the first embodiment, the amount of laser light of the black pixels 701, 702, 703 neighboring the white pixel 704 of interest is set to two-thirds the usual amount in such a manner that the potential that has built up in the area of the white pixel 704 falls below the threshold value of the developing bias. Since this value is one decided in accordance with the size of the laser spot on the photosensitive drum 117a, the amount of laser light and the value of the developing bias that decides the threshold value, it is required that the amount of laser light at the time of the correction be set suitably in accordance with the laser printer.

Further, it goes without saying that the amount of laser light may also be changed, for every pixel that is the object of correction, in accordance with the pixel pattern compared by the unit 630 that corrects the amount of laser light.

Second Embodiment

In the first embodiment set forth above, the amount of laser light is adjusted in single-pixel units. However, one pixel may be divided equally into n portions and the amount of laser light may be adjusted in (1/n)-pixel units obtained by such division into n portions. Operation in such case will be described as a second embodiment of the invention with reference to the drawings. It should be noted that the structure of the logic system according to the second embodiment is similar to that of the first embodiment and need not be described again.

Figure 14:
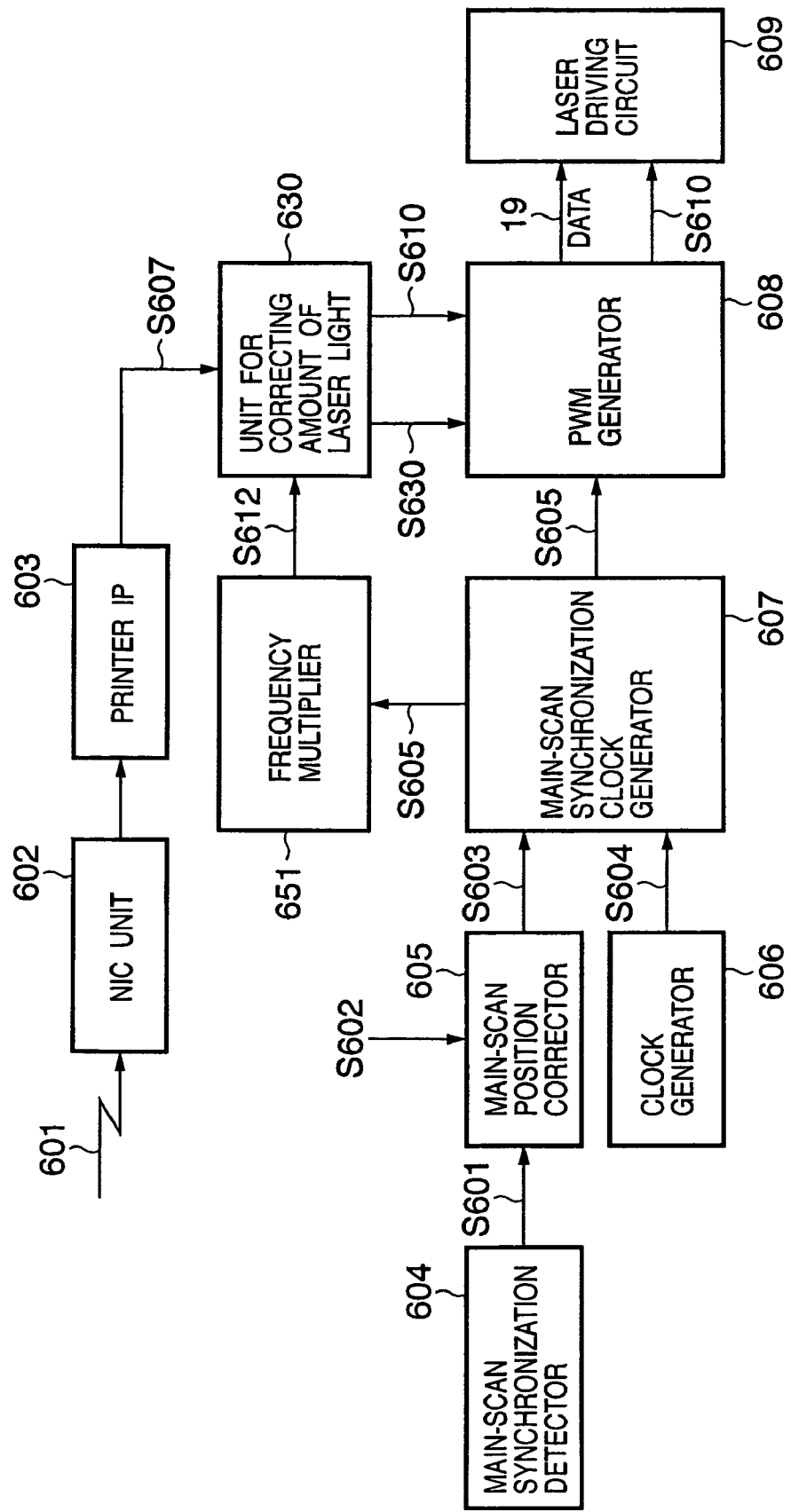
FIG. 14 is a block diagram for describing the principal components of a controller that controls image formation in a laser printer according to a second embodiment of the present invention.

FIG. 14 is a block diagram for describing the principal components of a controller that controls image formation in the laser printer 110 according to a second embodiment of the present invention. Components in FIG. 14 similar to those shown in FIG. 4 are designated by like reference characters and need not be described again.

The signal S605 from the main-scan synchronization clock generator 607 is input to a frequency multiplier 651, which proceeds to multiply the frequency of this signal by n. In the second embodiment, in order to simplify the description, frequency is doubled in order to divide one pixel into two equal portions. However, in a case where the amount of laser light is controlled more finely, it will suffice to enlarge the value of n. A clock S612 whose frequency has been doubled is input to the unit 630 that corrects the amount of laser light.

In this case, the unit 630 according to the second embodiment has a structure that differs slightly from that shown in FIG. 9, and the corrector 623 that corrects the amount of laser light outputs the signal S610, which corrects the amount of laser light, in sync with the clock S612 of doubled frequency. Thus, the correction signal S610 is output in (1/n)-pixel units.

Figure 15:
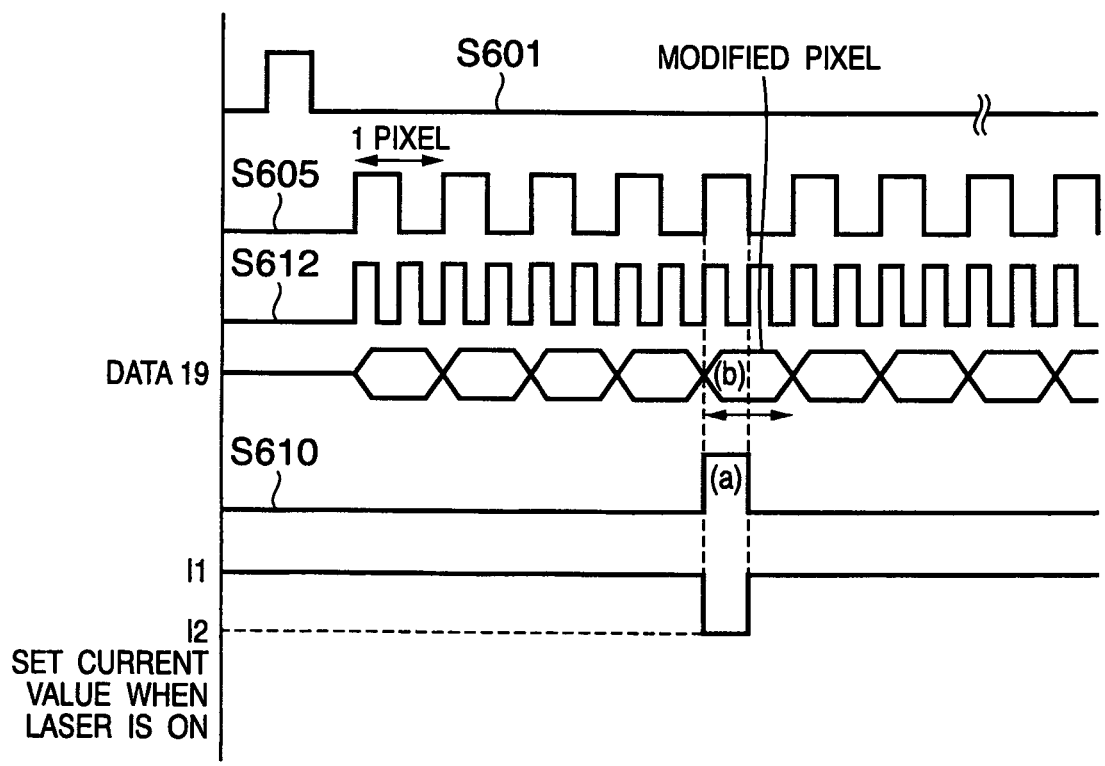
FIG. 15 is a timing chart for describing correction of amount of laser light in (1/n)-pixel units according to the second embodiment.

FIG. 15 is a timing chart for describing correction of amount of laser light in (1/n)-pixel units according to the second embodiment. Here signals similar to those shown in FIG. 14 are designated by like reference characters.

The pixel clock S605 is output from the main-scan synchronization clock generator 607 in sync with the main-scan synchronization signal S601 that is output from the main-scan synchronization detector (BD sensor) 604. If it is determined by the comparator 625 at the timing of the pixel (modified pixel) indicated at (b) in FIG. 15 that the DATA signal 19 that is output from the PWM generator 608 matches a prescribed comparison pattern, then the signal S610 for correcting the amount of laser light is output at the high level at this timing from the corrector 623 that corrects the amount of laser light. In the second embodiment, however, the signal S610 is output in sync with the clock S612 of doubled frequency. Accordingly, during the time that the signal S610 is at the high level, the analog switch 9 opens, the emitter current of the transistor 13 rises and the value of the current that flows through the semiconductor laser 2 is kept low. In FIG. 15, the current value when the laser is on is reduced from I1 to I2 (where I1>I2 holds).

It should be noted that although the signal S610 for correcting the amount of laser light is raised to the high level (control state) in the first half of the period of one pixel, the signal S610 may just as well be raised to the high level in the second half of the period of one pixel. Alternatively, it may be so arranged that the timing at which the signal S610 is raised to the high level is changed over suitably in the first or second half of the period of one pixel in accordance with the matching pattern.

Figure 16:
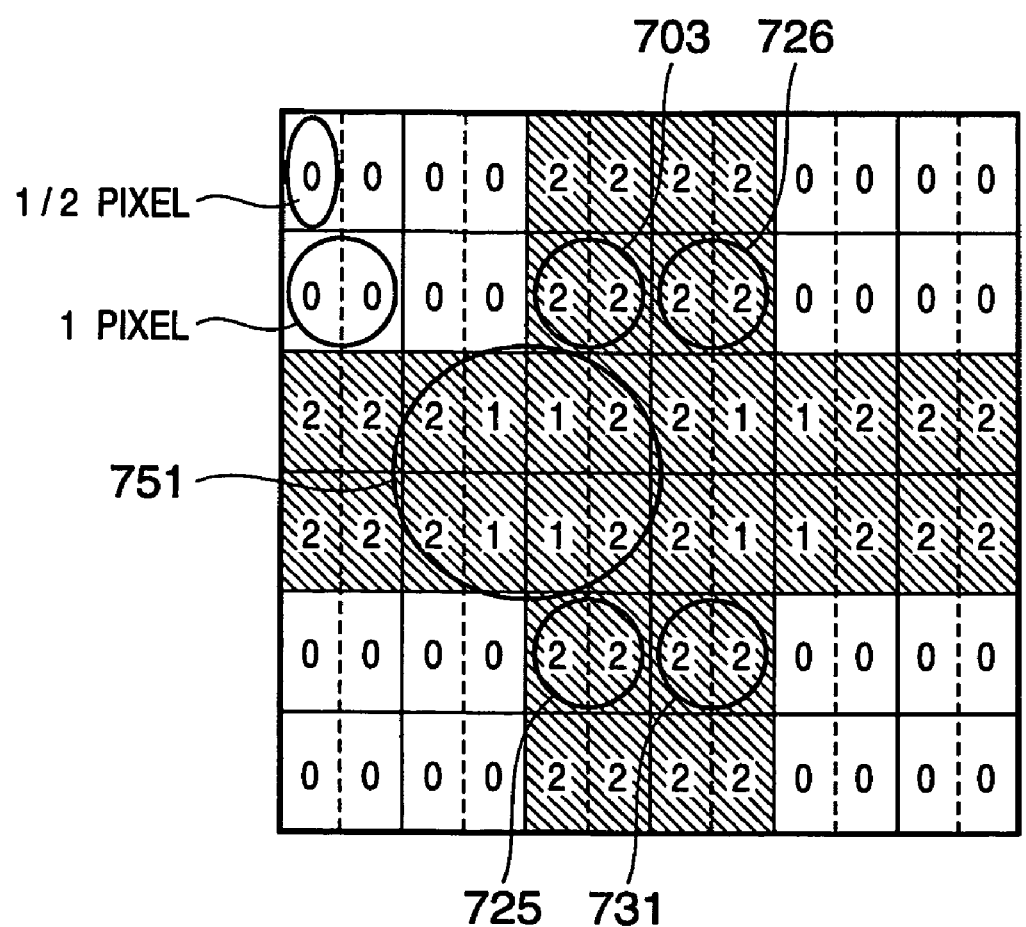
FIG. 16 is an enlarged view of an intersection in the small-point character that has been controlled in the second embodiment.

FIG. 16 is an enlarged view of intersection 711 in the small-point kanji character illustrated in FIG. 17. FIG. 16 illustrates a state in which the amount of laser light is being controlled in (½)-pixel units in each pixel.

In a manner similar to that shown in FIG. 13, the numerical values within each of the pixels represent the strength of the laser light. Numerical value "0" indicates laser OFF, numerical value "2" indicates ordinary amount of laser light, and numerical value "1" indicates an amount of laser light that is two-thirds of the ordinary amount. It should be evident that in comparison with FIG. 13, the area of each pixel is being controlled in area units that are half those of FIG. 13. In this example, the pattern compared is different from that used in the case of FIG. 13. As a result, the amount of laser light of black pixels 703, 725, 726, 731 (see FIG. 11), in which the amount of laser light was controlled in the first embodiment, is not controlled in the second embodiment.

Thus, in accordance with the second embodiment, increased thickness at intersections can be reduced more finely by controlling the intensity of the laser beam in (1/n)-pixel units (n is an integer).

Further, as shown in FIG. 16, the area in which the amount of laser light is controlled in (½)-pixel units is changed in accordance with pixel position by the corrector 623 of the unit 630 that corrects the amount of laser light in the second embodiment. As a result, areas in which the amount of bias declines overall are set, as indicated at spot 751, and the other pixels are formed by the ordinary amount of laser light to the greatest extent possible, thereby making it possible to prevent increased thickness of characters without lowering the quality of the original image.

The present invention is not limited to the above embodiments, and various changes and modification can be made thereto within the spirit and scope of the present invention. Therefore, to apprise the public of the scope of the present invention, the following claims are made.

This application claims the benefit of Japanese Application No. 2005-054537, filed on Feb. 28, 2005, which is hereby incorporated by reference herein in its entirety.

What is claimed is:

1. An image forming apparatus comprising:
    an image forming unit configured to form an image based upon a laser beam emitted from a semiconductor laser in accordance with an image signal;
    a driving unit configured to drive a current through the semiconductor laser;
    a determination unit configured to determine whether a M×N pixel pattern included in the image formed by said image forming unit has a pattern representing an intersection of plural lines or a pattern representing a part of the intersection; and
    a control unit configured to control said driving unit to change over a current value of the current that flows through the semiconductor laser in a period of a pixel to be controlled in the pattern, when the laser beam of the pixel to be controlled is emitted, in a case where it is determined by said determination unit that the image has the pattern,
    wherein said control unit controls to change over the current value of the current from a first current value to a second current value which is less than the first current value in the period of the pixel, such that an amount of the laser beam emitted from the semiconductor laser is changed over in the period of one pixel.

2. The apparatus according to claim 1, wherein the pixel to be controlled is a pixel for forming an image and is situated in the proximity of a pixel for forming no image.

3. The apparatus according to claim 1, wherein said control unit controls to change over the current value of the current from the second current value to the first current value in the period of another pixel to be controlled, which is different from the pixel to be controlled, such that an amount of the laser beam emitted from the semiconductor laser is changed over in the period of one pixel.

4. A method of controlling an image forming apparatus for forming an image based upon a laser beam emitted from a semiconductor laser in accordance with an image signal, comprising:
    a determination step of determining whether a M×N pixel pattern included in an image to be formed has a pattern representing an intersection of plural lines or a pattern representing a part of the intersection; and
    a control step of controlling to change over a current value of the current that flows through the semiconductor laser in a period of a pixel to be controlled in the pattern, when the laser beam of the pixel to be controlled is emitted, in a case where it is determined in said determination step that the image has the pattern,
    wherein said control step controls to change over the current value of the current from a first current value to a second current value which is less than the first current value in the period of the pixel, such that an amount of the laser beam emitted from the semiconductor laser is changed over in the period of one pixel.

5. The method according to claim 4, wherein the pixel to be controlled is a pixel for forming an image and is situated in the proximity of a pixel for forming no image.

6. The method according to claim 4, wherein in said control step, the current value of the current is changed over from the second current value to the first current value in the period of another pixel to be controlled, which is different from the pixel to be controlled, such that an amount of the laser beam emitted from the semiconductor laser is changed over in the period of one pixel.

* * * * *